United States Patent [19]

Van Twuyver et al.

[11] 4,236,276

[45] Dec. 2, 1980

[54] BIVALVE MOLLUSK SHUCKING APPARATUS AND METHOD

[75] Inventors: Robert Van Twuyver; James M. Johnson, both of Ipswich, Mass.

[73] Assignee: Northeast Shipley Company, Ltd., Ipswich, Mass.

[21] Appl. No.: 765,522

[22] Filed: Feb. 3, 1977

[51] Int. Cl.³ .............................................. A22C 29/04
[52] U.S. Cl. ............................................ 17/48; 17/74
[58] Field of Search ........................ 17/74, 48; 62/63

[56] References Cited

U.S. PATENT DOCUMENTS

| | | | |
|---|---|---|---|
| 2,047,688 | 7/1936 | Jenkins | 17/48 |
| 2,297,411 | 9/1942 | Henning | 17/48 |
| 3,037,237 | 6/1962 | LaPeyre et al. | 17/74 |
| 3,230,580 | 1/1966 | Marvin et al. | 17/48 |
| 3,402,568 | 9/1968 | Kamin | 62/63 |
| 3,431,745 | 3/1969 | Harper et al. | 62/63 |
| 3,507,128 | 4/1970 | Murphy et al. | 62/63 |
| 3,521,124 | 9/1970 | Wenstrom et al. | 17/74 |
| 3,566,438 | 3/1971 | Snow | 17/74 |
| 3,594,859 | 7/1971 | Hanks, Jr. | 17/74 |
| 3,594,860 | 7/1971 | Nelson | 17/74 |
| 3,614,806 | 10/1971 | Henry | 17/74 |

*Primary Examiner*—Paul J. Hirsch
*Attorney, Agent, or Firm*—Mason, Fenwick & Lawrence

[57] ABSTRACT

Clams are conveyed in support cradles first past liquid nitrogen applying nozzles then through high intensity flame to effect opening of the shells of the clams which are then dumped into a tumbler and then into a flotation tank for final flesh-shell separation.

16 Claims, 6 Drawing Figures

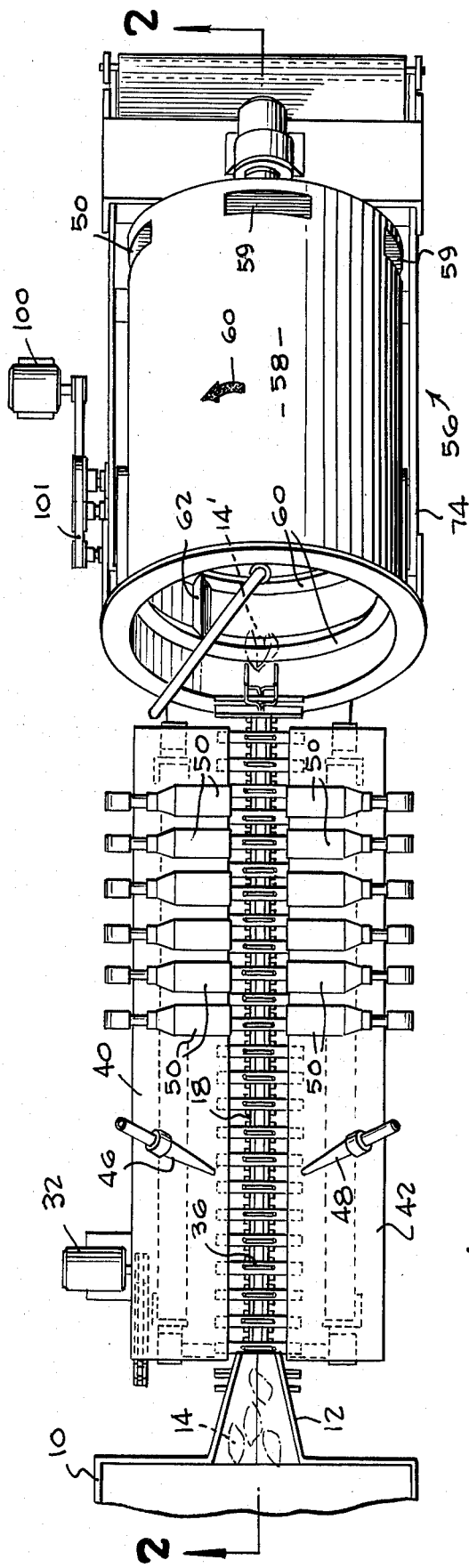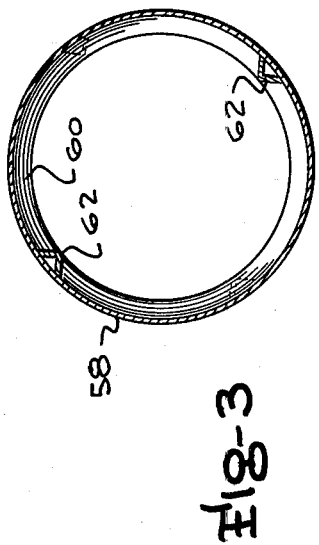

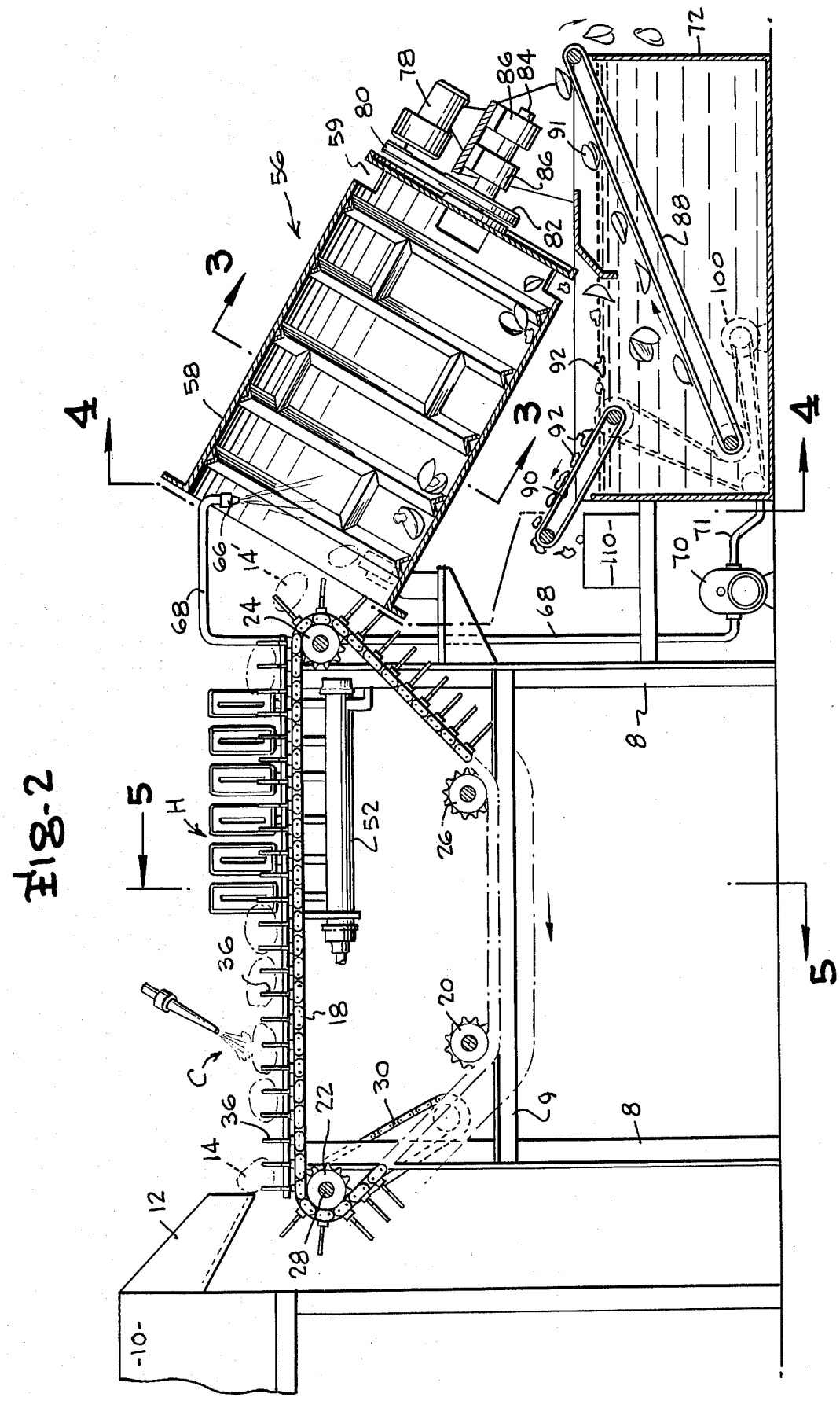

U.S. Patent  Dec. 2, 1980  Sheet 3 of 3  4,236,276
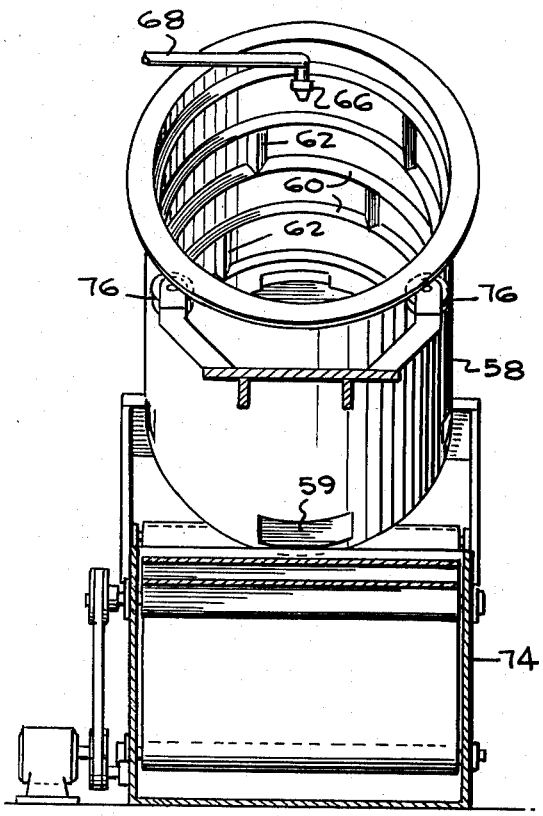
Fig. 4
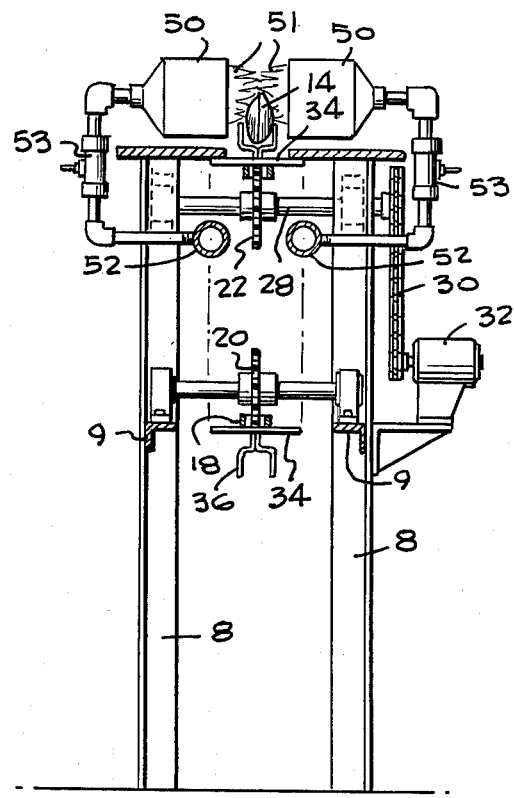
Fig. 5
Fig. 6

BIVALVE MOLLUSK SHUCKING APPARATUS AND METHOD

This invention relates to the field of food processing and is more specifically directed to separation of the flesh and shells of shell fish such as bivalve mollusks by a unique apparatus and method.

Even more specifically, the invention is directed to automatically effecting the opening of a bivalve mollusk and the separation of the flesh of the mollusk from the shell for further processing.

Oysters, clams, scallops and mussels and other shell fish collectively referred to as bivalve mollusks all have two hingedly connected shells components which are held in a closed position by powerful adductor muscles. While it is possible to open bivalve mollusks by a hand shucking operation, the procedures require a certain amount of manual dexterity, skill and strength and the number of mollusks that can be shucked by even the most skilled worker is rather limited due to the time required for each shucking operation. Moreover, the hand shucking of shell fish is a tiresome operation for which adequate labor is frequently not available. Consequently, these facts have resulted in many attempts to provide apparatus capable of automatically separating the flesh of the shells of bivalve mollusks from the shells. These devices have employed a wide variety of approaches including mechanical means, electrical means and heat-applying means for effecting the opening of the shells and separation of the flesh from the shells by various means none of which have proven to be entirely satisfactory. Problems with such machines have included a failure to effect separation of the flesh from an unsatisfactorily large percentage of the mollusks, the inclusion of shell debris in the flesh of the mollusks and the unsatisfactory changing of the taste of the mollusk flesh by the over application of heat or the like during the process. Evidence of the failures and shortcomings of the various apparatus proposed for effecting the evisceration of mollusks is the fact that the vast majority of mollusks harvested in this country are still cleaned by hand.

Therefore, it is the primary object of this invention to provide a new and improved apparatus and method for effecting the opening of the shells of bivalve mollusks.

A further object of the invention is the provision of new and improved apparatus and method for effecting the separation of the flesh of a bivalve mollusk from its shell.

Achievement of the objects of this invention is enabled by the preferred embodiment which includes conveyor means receiving bivalve mollusks and conveying same immediately past liquid nitrogen applying nozzle means which subjects the outer surface of the shells of the mollusks to low temperatures in the order of −195.5° C. or less with the conveyor means immediately conveying the chilled mollusks between high temperature gas burner means so that the mollusk is rapidly subjected to an extreme thermal shock resulting in opening of the shell. The conveyor then dumps the opened mollusks into a tumbling means in which they are subjected to substantial agitation and spraying separating the shell and flesh components and from which the mollusks are deposited into a flotation separator tank containing liquid in which the flesh components will float to the surface of the liquid. A removal conveyor lifts the flesh components from the liquid and deposits same into a container while a shell discharge or waste conveyor removes the shell components from the bottom of the separator tank for subsequent disposal. The entire process is automatically effected with a high percentage of flesh recovery from the mollusk with practically no manual labor being required.

A better understanding of the manner in which the preferred embodiment of the invention achieves the objects of the invention will be enabled when the following written description is considered in conjunction with the appended drawings in which:

FIG. 1 is a top plan view of the preferred embodiment for practice of the invention;

FIG. 2 is a sectional view taken along lines 2—2 of FIG. 1;

FIG. 3 is a sectional view taken along lines 3—3 of FIG. 1;

FIG. 4 is a sectional view taken along lines 4—4 of FIG. 1;

FIG. 5 is a sectional view taken along lines 5—5 of FIG. 1; and

FIG. 6 is a perspective view illustrating conveyor and mollusk discharge components of the preferred embodiment.

Attention is initially invited to FIG. 1 of the drawings which illustrates all of the essential components for practice of the invention with the process being illustrated in conjunction with the shucking of clams. However, it should be understood that the apparatus and process can also be employed for shucking other bivalve mollusks such as oysters, etc. with only slight modifications.

In any event, a supply of clams if provided in a feed hopper 10 having a discharge conveyor chute 12 of conventional design for supplying individual clams 14 to a transport conveyor 16 supported on a framework consisting of vertical members 8 and horizontal members 9 etc. Transport conveyor 16 consists of driven chain means 18 supported by sprockets 20, 22, 24 and 26 and has an upper horizontal flight extending between sprockets 22 and 24. It will be observed that sprocket 22 is mounted on a shaft 28 driven by a drive chain 30 extending from and drivingly connected to a drive motor 32.

A plurality of guide plates 34 are attached to a driven chain 18 with wire type Y-shaped cradle members 36 being connected to the guide plates 34 as best illustrated in FIG. 6. Cradle members 36 are dimensioned and shaped so as to be able to support clams 14 for transport past a work station along the conveyor.

It will be observed that the upper flight of the driven chain 18 extends in horizontal orientation between the sprockets 22 and 24 with the Y-shaped cradle members 36 being positioned in a slot between the two horizontal spaced feed table components 40 and 42 with the cradle members being positioned above the upper surface of the feed table components. Engagement of the guide plates 34 with the table components maintains the Y-shaped cradle members in vertical orientation for passage along the upper flight of the driven chain 18 so that the clams are first moved through a cryogenic chilling work station C and, then, immediately through a heating work station H.

Clams 14 are received in the cradles 36 and oriented with their hinge portions in a lower position for conveyance along the upper flight of the driven chain 18. The clams are initially conveyed beneath and between a pair of liquid nitrogen applying nozzle means 46 and 48 in cryogenic chilling work station C connected to a conventional source of liquid nitrogen which is applied directly to the outer surface of the shells of the clams to quickly chill the clams without freezing the flesh on the interior of the shell. The clams are then conveyed immediately between gas burners 50 in the heating work station H spaced in two rows along opposite sides of the upper flight of the driven chain 18 so that the high intensity flames 51 from the burners 50 provided by gas applied through supply manifold means 52 and control valves 53 subjects the shell of the clam to high intensity heat and great thermal shock resulting in the opening of the clam shell as shown by clam member 14' in FIG. 6. The opened clams are then discharged from the downstream end of the conveyor into a tumbler means 56 consisting of a barrel-like body 58 driven in the direction of arrow 60 in FIG. 1.

Barrel-like body 58 is provided on its interior with a plurality of annular ribs 60 connected by shorter longitudinal ribs 62 for engaging and tumbling the opened clam members 14' to effect dislodging of the flesh from the shell components. A water spray nozzle 66 provides a spray of water or saline solution into the interior of the barrel-like body 58 supplied via a conduit 68 extending from the outlet of a pump 70 connected by an inlet line 71 to the lower portion of a flotation or settlement tank 72 which contains a quantity of water or saline solution.

The barrel-like body 58 of the tumbler means 56 is supported on a framework 74 including idler rollers 76 engaging the upper end of the barrel-like member 56 and supporting same for rotation by a drive motor 78 connected by a drive belt 80 to an input pulley 82 fixed to an axle 84 on the lower end of the barrel-like member.

Separator tank 72 includes a waste discharge conveyor 88 and a flesh removal conveyor 90 with conveyor 88 serving to remove shell components 91 and conveyor 90 serving to remove flesh components 92 from the liquid in separator tank 72.

The opened clam members 14' are dumped into the upper end of the rotating barrel-like member 58 and are tumbled and agitated on the interior of the barrel-like member with the spray from nozzle 66 aiding in the separation of the flesh components from the shell components. The clams work their way downwardly along the length of the rotating barrel-like member 58 and are discharged through openings 59 positioned about the periphery along the lower end of the barrel-like member. The clams fall into the liquid in the separator tank 72 and the flesh components 91 sink and fall onto the conveyor means 88. Conveyor means 88 and 90 are both driven by motor means 100 and belt means 101 as shown in FIG. 1 so that the flesh components 92 and the shell components 91 are removed from the tank 72. Flesh components 92 are fed into a suitable container 110 while the shell components are suitably disposed of as waste.

Numerous modifications of the preferred embodiment will undoubtedly occur to those of skill in the art. For example, it should be understood that the bivalve mollusks are not limited to clams and can be positioned on the conveyor means 18 by hand if desired; the number of the burners 50 and liquid nitrogen applying nozzles 46 and 48 can be varied in accordance with the feed speed of the conveyor. Therefore, it should be understood that the spirit and scope of the invention is to be limited solely by the appended claims.

We claim:

1. A system for effecting the opening of the shell of bivalve mollusks comprising means for applying liquid nitrogen to the external surface of the shell of a bivalve mollusk without freezing the flesh on the interior of the shell and heat applying means for immediately thereafter applying a high temperature media to the external surface of the shell.

2. The invention of claim 1 wherein said heat applying means comprises burner means.

3. The invention of claim 1 wherein said heat applying means comprises a plurality of gas burners for applying heat to the shell of the bivalve mollusk from two opposite sides of the bivalve mollusk.

4. The invention of claim 1 wherein said heat applying means comprises a plurality of gas burners for applying heat to the shell of the bivalve mollusk from two opposite sides of the mollusk and additionally including tumbling means for separating the shell portions of the bivalve mollusk from the flesh portions thereof.

5. The invention of claim 4 additionally including conveyor means supporting said bivalve mollusk during the application of said liquid nitrogen and for subsequently conveying said mollusks past said heating means and thence to said tumbling means.

6. Shell fish opening means comprising the combination of chilling means for applying a cryogenic material to the outer surface of the shells of shell fish without freezing the flesh on the interior of the shells, heating means for heating the outer surface of the shells of shell fish and conveying means for conveying the individual shell fish first through said chilling means and immediately thereafter through said heating means.

7. The invention of claim 6 wherein said cryogenic chilling means comprises first and second nozzle means positioned on opposite sides of said conveying means for applying liquid nitrogen to the outer surface of the shells of said shell fish.

8. The invention of claim 6 wherein said cryogenic chilling means comprises first and second nozzle means positioned on opposite sides of said conveying means for applying liquid nitrogen to the outer surface of the shells of said shell fish and said heat applying means comprises burner means positioned along opposite sides of said conveying means.

9. The invention of claim 6 wherein said cryogenic chilling means comprises first and second nozzle means positioned on opposite sides of said conveying means for applying liquid nitrogen to the outer surface of the shells of said shell fish and said heat applying means comprises burner means positioned along opposite sides of said conveying means, and additionally including tumbler means positioned to receive opened shell fish from said conveyor downstream of said burner means.

10. The invention of claim 6 wherein said cryogenic chilling means comprises first and second nozzle means positioned on opposite sides of said conveying means for applying liquid nitrogen to the outer surface of the shells of said shell fish and said heat applying means comprises burner means positioned along opposite sides of said conveying means, and additionally including tumbler means positioned to receive opened shell fish from said conveyor downstream of said burner means and a flotation tank including a quantity of liquid into which the shells and flesh portions of said shell fish are introduced from said tumbling means.

11. A method of opening bivalve mollusks consisting of the sequential steps of applying cryogenic liquid to the outer surfaces of the shells without freezing the flesh on the interior of the shells of said mollusks and immediately thereafter subjecting the outer surfaces of the shells of said mollusks to high intensity heat.

12. The method of claim 11 additionally including the step of subjecting said mollusks to tumbling action following the application of heat thereto.

13. The method of claim 11 wherein said cryogenic liquid is liquid nitrogen.

14. The method of claim 11 wherein said cryogenic liquid is liquid nitrogen and said high intensity heat is applied to said mollusks by moving said mollusks through the flame of gas burner means.

15. The invention of claim 14 additionally including the step of subjecting said mollusks to tumbling acton following the application of heat thereto.

16. The method of claim 15 including the additional step of placing the shells and flesh of said mollusks in a quantity of liquid in which the flesh will float and separate from the shells following said tumbling action.

* * * * *